April 29, 1969 A. W. GEBAUER 3,441,131
PARTICLE SEPARATION APPARATUS AND METHOD
Filed Oct. 18, 1965 Sheet 1 of 3

INVENTOR.
ALBERT W. GEBAUER
By White & Haefliger
ATTORNEYS.

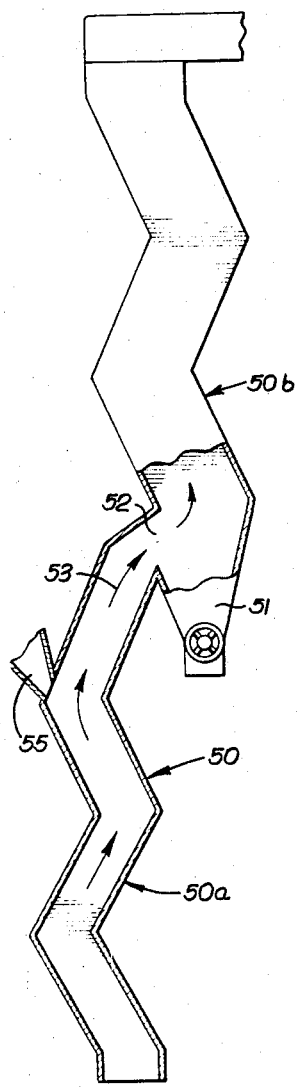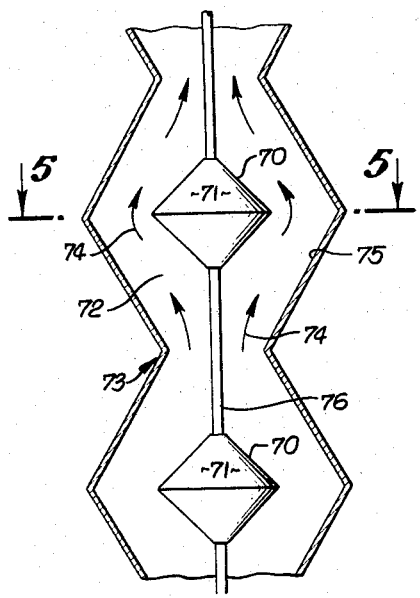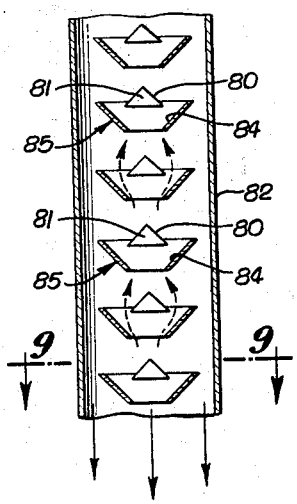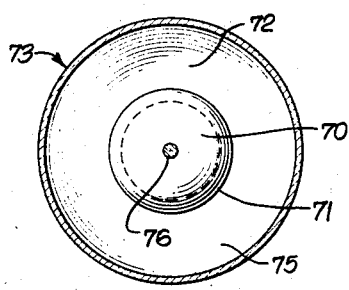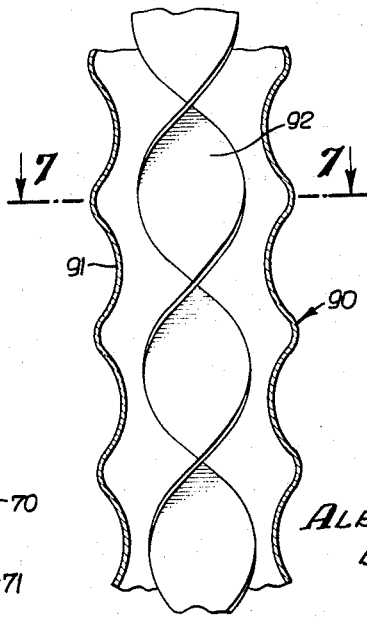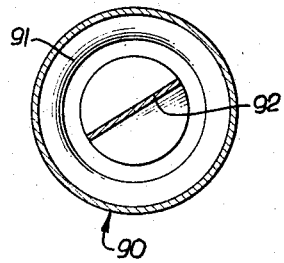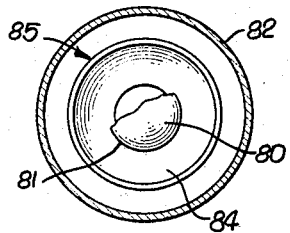

April 29, 1969  A. W. GEBAUER  3,441,131

PARTICLE SEPARATION APPARATUS AND METHOD

Filed Oct. 18, 1965  Sheet 3 of 3

INVENTOR.
ALBERT W. GEBAUER
BY White & Haefliger
ATTORNEYS.

United States Patent Office 3,441,131
Patented Apr. 29, 1969

3,441,131
PARTICLE SEPARATION APPARATUS
AND METHOD
Albert W. Gebauer, Denver, Colo., assignor to Scientific Separators, Inc., Denver, Colo., a corporation of Colorado
Filed Oct. 18, 1965, Ser. No. 497,291
Int. Cl. B07b 11/04, 4/04
U.S. Cl. 209—3  21 Claims

ABSTRACT OF THE DISCLOSURE

Apparatus for separating light particles from heavy particles introduced to a duct via a side inlet, and gas being drawn upwardly in the duct by suction applied from the duct interior to the side inlet to carry the light particles upwardly within the duct. The heavier particles drop and cascade within the duct in the path of upward gas flow. Additionally, there may be provision for gas flow control, particle cascade control, and flushing.

---

This invention relates generally to particle separation and more particularly concerns unusually advantageous method and apparatus for separating, classifying and purifying mixtures of particles through the use of gas or air streams.

In many processes where the handling of solids is involved, there exists a need for separation of mixtures of various sizes, shapes and densities. Air classification is one process which is effective in providing separations based on the settling velocity of the particles involved. The settling velocity of a particle is a function of its shape, size, and density. Should there be a large range of difference in any one of these three factors, separations can be achieved in an air stream by a number of air separation systems. Also if some form of pre-separation is used, such as screening by particle size, then air classification of the screen fractions can be used to provide separations on the basis of density. Unfortunately most air classification systems are not very efficient and therefore, several stages of air classification in series must be used if any degree of precision of separation is to be achieved; however, the construction of multi-stage systems is costly and their use is accordingly limited.

Another disadvantage with known air classification systems is their limitation to operations on free flowing solids. Thus, they cannot be used with materials that tend to agglomerate or to become entangled, such as masses of cotton fiber containing trash, dirt and stems.

It is a major object of the present invention to overcome the above mentioned disadvantages through the provision of novel and unusual systems for achieving air classification or separation of mixtures of particles, and which are highly effective and relatively inexpensive. Basically, the novel separator apparatus comprises generally vertical duct structure having a first inlet and a first outlet to pass a stream of suction gas upwardly in the duct interior; the duct having a second inlet above the level of the first inlet to pass particles of material into the duct; the duct structure containing surfaces facing upwardly in cascade relation within the duct interior and defining a tortuous path for the suction gas and the particles to travel in such relation that heavier particles tend to drop downwardly in the duct cascading off the surfaces and lighter particles tend to rise in the duct; together with means to create suction for drawing the gas stream through the duct outlet and to separate the carried over ligher particles from the suction gas stream. The latter may typically include a cyclone connected to receive the gas stream with the lighter particles, and the suction creating means may include a blower having an inlet connected to receive the gas stream from the cyclone, lighter particles being otherwise discharged from the cyclone.

Toward overcoming the problem of handling agglomerated materials, the apparatus may typically include means to process the agglomerated feed to particulate form and to deliver the particles to the duct second inlet. Thus, the processing means may take the form of a shredder having rotary members with projections to fragment the feed in the path of delivery thereof to the second inlet; in addition, the processing means may include cutters located in the path of delivery of the feed from the shredder to the duct second inlet to further fragment the feed. It is found that excellent separations can then be obtained of materials such as trash, stems and dirt from entangled masses of cotton fiber.

A further object of the invention is to provide a system including a zig-zag classifier column which can be easily assembled and disassembled in the field. To this end, the cascade surfaces within the column duct are typically located in two laterally separated generally vertical series, with certain of the surfaces carried for lateral adjustment relative to others of the cascade surfaces. Thus, a generally vertical support may carry the mentioned certain cascade surfaces at one side of the duct interior, and means may be provided to effect relative lateral adjustment of the support with respect to the other cascade surfaces.

Another object of the invention is to overcome the problem of obtaining only one separation, as for example into an overhead fraction and a bottoms fraction. Toward this end, one section of a zig-zag column is superimposed upon another one section having means to vary the cross sectional area of the zig-zag in that section which in turn varies the air velocity through that section of the column. If, for example, a multicomponent mixture is fed into the bottom section of the zig-zag column operation at a velocity $V_1$ a separation takes place whereby the heavy material goes out the bottom of this section, and a light material goes up into the second section of the column where the area has been varied to lessen the air velocity. A second bottom fraction is thereby dropped out into a collecting zone and the lighter materials are carried overhead by the lesser velocity $V_2$. The feature of providing a mechanical means of varying the area of the column enables one to run a variety of materials through the column rather than providing only one specific set of column areas. Another method to accomplish this objective is to provide a means of positive air removal in the various sections of the column thereby directly varying the air velocity in zone of the column to provide multiple separations as will be described in greater detail.

Further objects of the invention include the provision of an adjustable suction gas damper in the flow path of suction gas for controlling the suction gas velocity in the duct structure, thereby to adjust the size classification of lighter and heavier particles; the provision of a tab construction of duct sheets for simplifying the construction; the provision for flushing of the duct; the provision of baffles defining the mentioned certain surfaces and arranged in vertical sequential relation within the duct interior to effect repeated division and recombination of the upwardly flowing suction gas stream so that the cascading particles may repeatedly traverse the gas streams; the provision of means to rotate the baffles about a vertical axis, with resultant vortex centrifugal air classification and attendant advantages to be described; and the provision of so-called "chevron" and "diamond" multi-stage centrifugal air classification columns.

These and other objects and advantages of the invention, as well as the details of illustrative embodiments, will be more fully understood from the following detailed description of the drawings in which.

Figure 1:
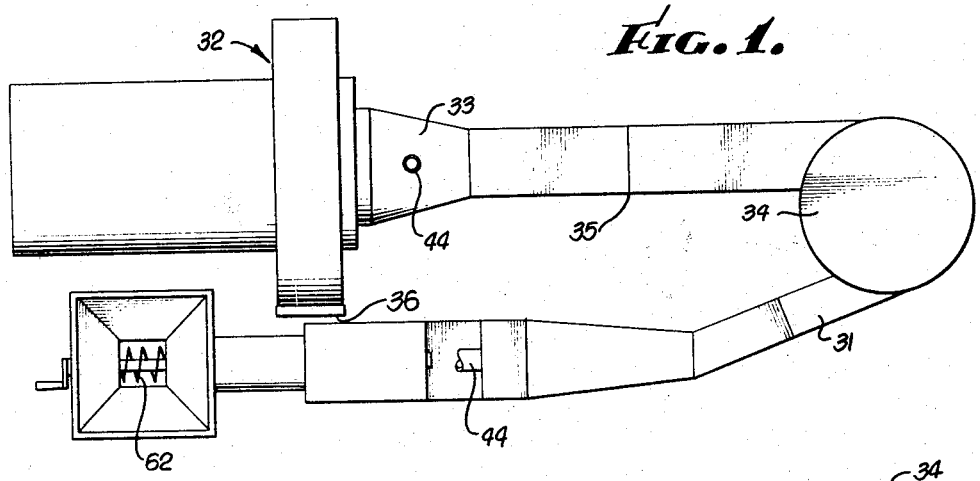
FIG. 1 is a top plan view of one preferred form of the apparatus, shown schematically.
Figure 10:
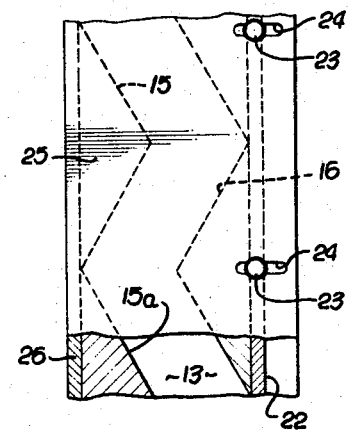
Figure 11:
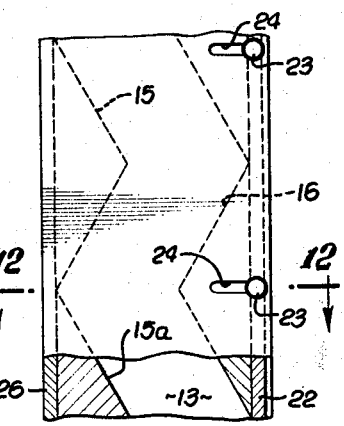
Figure 12:
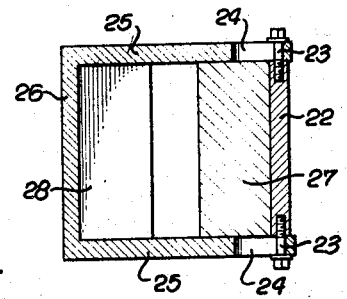
Figure 13:
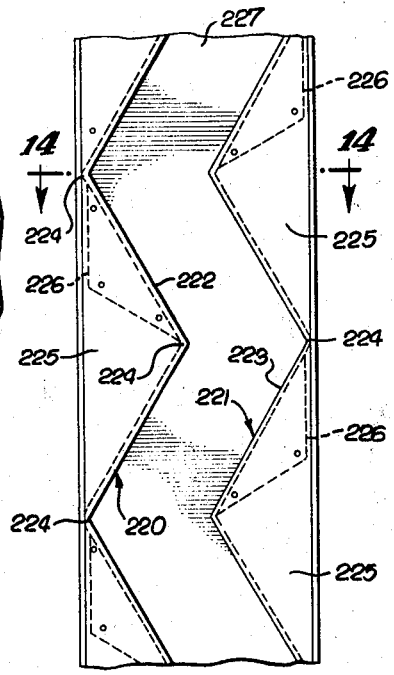
Figure 14:
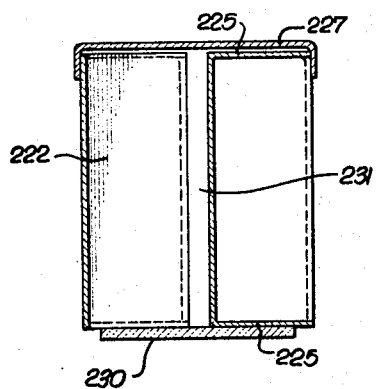

FIGS. 3, 4, 6, and 8 illustrate modified column ducts in vertical section;

FIG. 5 is a horizontal section taken on line 5—5 of FIG. 4;

FIG. 7 is a horizontal section taken on line 7—7 of FIG. 6;

FIG. 9 is a horizontal section taken on line 9—9 of FIG. 8;

FIG. 10 is an enlarged side elevation, partly in section, to show the detailed construction of an upper portion of the FIG. 1 column separator duct;

FIG. 11 is a view like FIG. 10, with the duct adjustably enlarged;

FIG. 12 is a horizontal section taken on line 12—12 of FIG. 11;

FIG. 13 is a vertical section showing details of duct construction;

FIG. 14 is a horizontal section taken on lines 14—14 of FIG. 13; and

Figure 15:
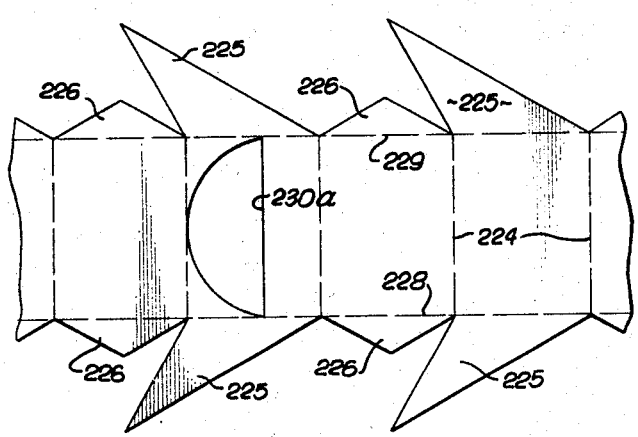

FIG. 15 is a layout plan of a sheet of FIG. 13 duct.

Figure 2:
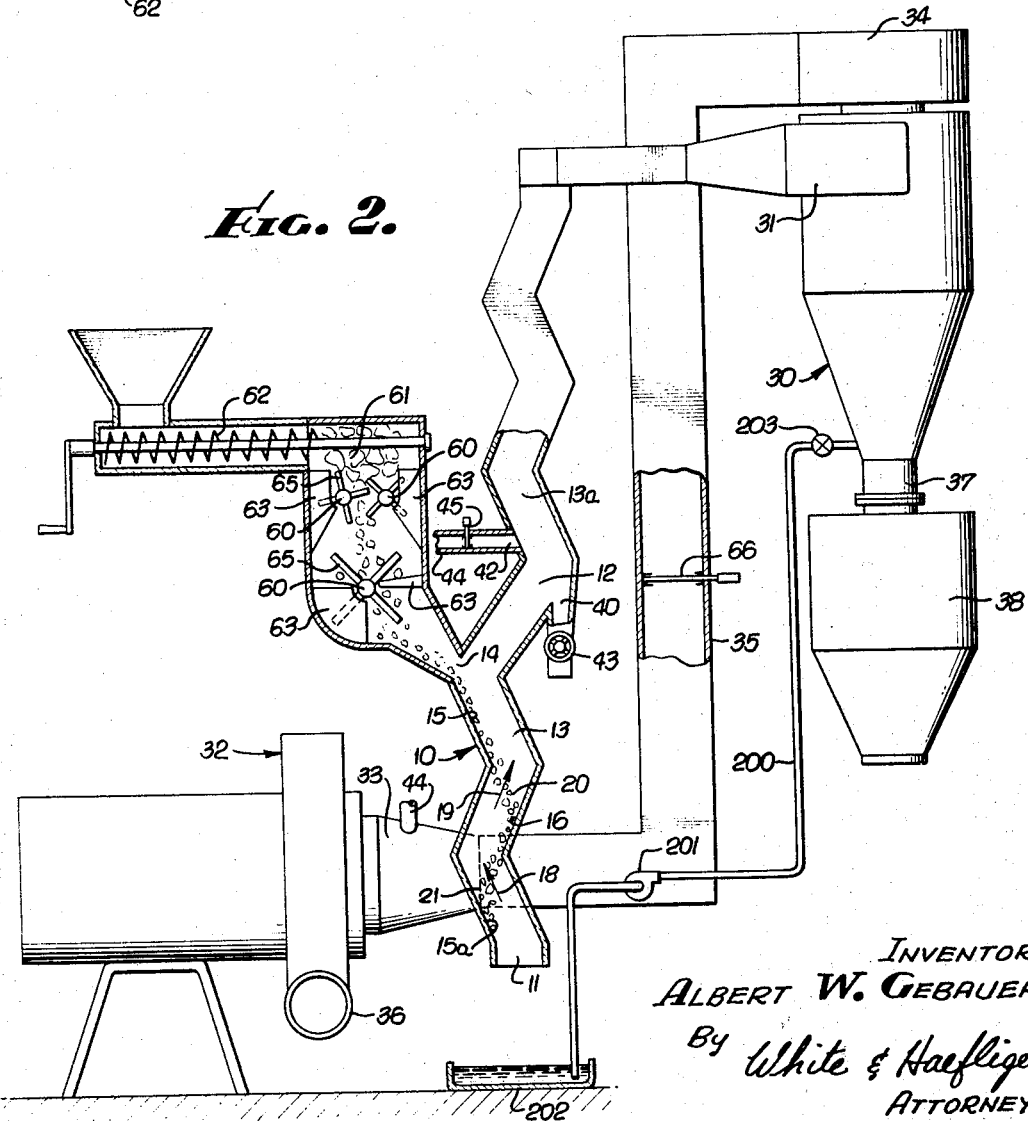
FIG. 2 is a side elevation, partly in section, of the FIG. 1 apparatus.

Referring first to FIGS. 1 and 2, the system includes generally vertical duct structure 10 having a first inlet such as 11 and a first outlet such as 12 to pass a stream of suction gas upwardly in the duct interior 13. The duct had a second inlet such as 14 above the level of the first inlet 11 to pass or admit particulate material into the duct interior. Also, the duct structure contains surfaces facing upwardly in cascade relation within the duct interior and defining a tortuous path for the suction gas or air and the particles to travel in such relation that heavier particles tend to drop downwardly in the duct, cascading off the surfaces and lighter particles tend to rise in the duct. For example, cascade surface may take the form as indicated at 15, 16 and 15a. Arrows 18 and 19 indicate suction air flowing upwardly through the heavier particles cascading in curtains at 20 and 21 off surfaces 15 and 16 respectively, whereby the lighter particles are separated from the heavies and carried off by the upward flowing air or other gas, producing an accurate control of particle classification.

The cascade surfaces are located in two laterally separated generally vertical series, and certain of the surfaces may typically be carried for lateral adjustment relative to others of the surfaces. Thus, in the more detailed duct structure shown in FIGS. 10-12, a generally vertical support such as plate 22 carries certain surfaces 16 at one side of the duct interior 13, and means is provided to effect relative lateral adjustment of the support plate 22 with respect to the other cascade surfaces 15. One such means includes adjustable connectors 23 received through transverse slots 24 in side plates 25 and to have connection with support plate 22, so that when the connectors are loosened the plate 22 can be shifted or adjusted laterally relative to support plate 26 for surfaces 15. Note in this regard that structure 27 is attached to plate 22 and forms surfaces 16, while structure 28 is attached to plate 26 and forms surfaces 15, the duct interior zig-zigging in generally upright direction. This provision of mechanical means for varying the cross-sectional area of the duct enables the running of a variety of materials through the separator for effective separation; also the operator in the field can very easily and rapidly adjust the equipment in the field to achieve the desired separation.

The system also includes means to create suction for drawing the gas stream through the duct outlet, as for example outlet 12, and to separate the lighter particles from the suction gas stream. Referring back to FIGS. 1 and 2, such means may typically include a cyclone 30 connected to receive at 31 the gas stream containing the carried-over lighter particles, and a blower 32 having an inlet 33 connected at 34 to receive the gas stream effluent from the cyclone and transmitted via duct 35 to the blower inlet. The blower discharge is indicated at 36, and the cyclone has a rotary lock type discharge at 37 to pass the lighter particles separated from the suction gas stream. Hopper 38 typically is provided to collect the lighter particle fraction.

As seen in FIG. 2, the duct structure 10 may have a second outlet 40 below the level of the first outlet 12 and laterally offset from the main path of suction gas flowing upwardly in the duct interior. Also, the duct may have a gas vent 42 for effecting a reduction in the upward velocity of suction gas in the interior region 13a above the level of the second outlet 40, so that a heavier weight fraction of the lighter particles carried up through outlet 12 may drop downwardly for ultimate escape through the second outlet, a valve control therefor being indicated at 43, as for example a rotary discharge. Vent 42 is typically returned at 44 to the blower inlet 33, and an adjustable suction gas damper 45 may be inserted in the flow path of vented suction gas for controlling the velocity of the main stream of suction gas in the duct 13a, thereby to adjust the classification of particles separated at 40.

FIG. 3 shows a modified arrangement wherein the zig-zag duct 50 has a second outlet 51 below the level of the first outlet 52 and is laterally offset from the main path of suction gas flowing upwardly as indicated by arrows 53. The ducting has a lower section 50a of relatively reduced cross sectional area, and an upper section 50b of relatively increased cross-sectional area above the level of second outlet 51, thereby to reduce the upward velocity of suction gas in section 50b so that a heavier fraction of the lighter particles carried over at 52 may drop downward for ultimate escape through outlet 51. The separating action of sections 50a and 50b is generally the same. The feed to the duct 50 is seen at 55. Detailed construction of the duct is described in connection with FIGS. 13–15.

Referring back to FIGS. 1 and 2, means may be provided to process agglomerated feed to particulate form, and to deliver the particles to the second inlet 14. Such processing means may typically include a shredder having a rotary member or members 60 with rod-like projections 65 thereon that intermesh to fragment the feed in the path of delivery thereof to the inlet 14. A rotary screw feed for the agglomerate 61 is seen at 62, discharging toward the shredder. The processing means may also typically include spaced cutters or bars 63 located in the path of delivery of the feed from the shredder to the inlet to further fragment the feed. In this regard, the projections 65 may rotate between the cutter bars as illustrated.

FIG. 2 also illustrates the use of an adjustable suction gas damper 66 in the flow path of suction gas for controlling its velocity in the duct structure 13 and 13a, thereby to adjust the classification of separated lighter and heavier particles.

Finally, FIG. 2 illustrates one form of means to create reverse flow of flushing liquid within the cyclone and downwardly within the duct structure. It may include a line 200 having a pump 201 to flow flush liquid from sump 202 via valve 203 to the cyclone 30, the rotary discharge 37 being closed. The liquid flows up in the cyclone and then spills through connection into the duct 10, wherein it drops to flush the duct, and drain into the sump.

FIGS. 4–9 illustrate modifications embodying separator ducts characterized by high capacity per unit volume, through providing for more crossings of the air stream by feed solid particles. In FIG. 4 certain cascade surfaces 70 are defined by baffles 71 arranged in vertical sequential relation within the interior 72 of the duct 73, the baffles effecting repeated division and recombination of the upwardly flowing suction air, as indicated by arrows 74. Other surfaces 75 are defined by the duct 73 and are angled for directing the heavier particles to cascade downwardly and laterally onto surfaces 70 and to receive impingement of heavier particles cascading off surfaces 70. Means to rotate the baffles 71 about a vertical axis may include a shaft 76 mounting the baffles, whereby separation is enhanced through centrifugal throw-out of particles cascading on the baffles. As is clear from FIG. 4, a double or multiplied zig-zag duct arrangement is provided, using a "diamond" baffle and duct pattern. The upward air velocity remains about the same at different points in the duct.

FIG. 8 illustrates a "chevron" arrangement, with double or multiple zig-zag column interior design. Cascade surfaces 80 are defined by baffles 81 arranged in vertical sequential relation within the interior of duct 82, the baffles effecting repeated division and recombination of the upward gas flow. Other surfaces 84 are defined by baffles 85 and are angled for directing the heavier particles to cascade downwardly and laterally onto surfaces 80, and to receive impingement of heavier particles cascading off surfaces 84.

A vortex centrifugal air classification column is seen in FIG. 6. Multistage air classification can be achieved in a round cross-sectional column 90 having pinched sections 91. In operation, the pinched in sections provide areas of higher air velocity than the non-pinched-in sections and thereby form a section of air classification. Material heavy enough to fall through the higher velocity air will proceed down the column and out the bottom. Lighter material will proceed up the column and out the top. Such systems are limited to operation with particles larger than one hundred microns in order to achieve any degree of capacity. To operate with particles smaller than one hundred microns, one can increase the effective weight of a particle by centrifugal force. By providing a vortical movement of air within the column by inserting spiral strips or sheet 92 down the length of the column, a centrifugal force field would be established. This would cause the column to be effective in the smaller particle ranges, since the centrifugal force field would in effect increase the weight of each particle and thus increase its settling velocity.

FIGS. 13–15 illustrate in more detail the construction of the duct structure seen in FIG. 3. The lower duct section is formed by metallic sheets 220 and 221 on which cascade surfaces 222 and 223 are carried or formed. Each sheet 220 and 221 has generally horizontal and vertically staggered bends, as for example are seen at 224 on sheet 220. Also, each sheet carries tabs projecting in interconnected overlapping relation at vertically spaced locations. See for example large tabs 225 connected as by welding to small tabs 226, facilitating a one-piece sheet construction facilitating simple connection of both sheets as by bracketing side channel 227 in FIG. 14, the latter holding the sheets in properly spaced relation. The tabs are bent along lines 228 and 229 in FIG. 15 and normal to the planes of the cascade surfaces 222 to facilitate their overlapping connection, after the bends at 224 are made. The feed inlet is seen at 230a. FIG. 14 shows a transparent window plate 230 adjacent the ductwork and covering the side of the duct space or interior 231, for viewing purposes.

I claim:
1. In separator apparatus of the character described, generally vertical duct structure having a first inlet and a first outlet to pass a stream of suction gas upwardly in the duct interior, the duct having a second inlet above the level of the first inlet to pass particles of material into the duct, the duct structure containing surfaces facing upwardly and sloping downwardly and laterally in cascade relation within the duct interior and defining a tortuous path for the suction gas and said particles to travel in such relation that heavier particles tend to drop downwardly in the duct cascading off surfaces and lighter particles tend to rise in the duct, means to create suction for drawing said gas stream upwardly through the duct via said first inlet and first outlet and to separate the lighter particles from the suction gas stream, said suction being applied to said second inlet from the duct interior, said last named means including a cyclone connected to receive said gas stream with said lighter particles and a blower having an inlet connected to receive the gas stream effluent from the cyclone, the cyclone having a discharge to pass said lighter particles, and said blower having an outlet for discharging the gas stream effluent from the cyclone, said blower outlet being out of gas discharge supplying communication with the duct interior below the level of said duct second inlet so as not to disturb maintenance of suction in the duct interior proximate said duct second inlet, and means for controlling venting of the gas from said upper portion of said zone to control the upward velocity of suction gas in the duct interior above the level of the second inlet to control the classification as between lighter and heavier particles.

2. The combination as defined in claim 1 including other means to process a feed to particulate form and to deliver the particles to said second inlet, said other means including conveyor structure extending in impeding relation to gas travel toward the duct interior via the second inlet.

3. The combination as defined in claim 2 in which said processing means includes a shredder having rotary members with projections thereon to fragment the feed in the path of delivery thereof to said second inlet.

4. The combination as defined in claim 3 in which said processing means includes cutters located in the path of delivery of the feed from the shredder to said inlet to further fragment the feed.

5. The combination as defined in claim 1 in which said cascade surfaces are located in two laterally separated generally vertical series, the space between said series of surfaces being unobstructed to allow particle cascading fully across said space, certain of said surfaces being carried for lateral adjustment relative to other of said surfaces.

6. The combination as defined in claim 5 including a generally vertical support carrying said certain surfaces at one side of the duct interior, and means to effect relative lateral adjustment of said generally vertical support with respect to said other cascade surfaces.

7. The combination of claim 1 in which said duct structure has a valve controlled second outlet below the level of said first outlet and laterally offset from the main path of suction gas flowing upwardly in said duct structure, the duct structure having increased cross sectional flow stream area above the level of the second outlet to reduce the upward velocity of suction gas therein so that a fraction of said lighter particles of relatively heavier weight may drop downwardly for ultimate escape through said second outlet.

8. The combination as defined in claim 1 including an adjustable suction gas control in the flow path of suction gas for controlling the suction gas velocity in the duct structure, thereby to adjust the classification of lighter and heavier particles.

9. The combination of claim 1 including means to create reverse flow of flushing liquid within said cyclone and downwardly within the duct structure.

10. The combination of claim 1 in which said cascade surfaces are carried on metalic sheets each having generally horizontal and vertically staggered bends, each sheet carrying tabs projecting in interconnected overlapping relation at vertically spaced locations.

11. The combination of claim 1 including a transparent viewing plate acting to confine the duct interior at a side thereof.

12. In separator apparatus of the character described, generally vertical duct structure having a first inlet and a first outlet to pass a stream of suction gas upwardly in the duct interior, the duct having a second inlet above the level of the first inlet to pass particles of material into the duct, the duct structure containing surfaces facing upwardly and sloping downwardly and laterally in cascade relation within the duct interior and defining a tortuous path for the suction gas and said particles to travel in such relation that heavier particles tend to drop downwardly in the duct cascading off said surfaces and lighter particles tend to rise in the duct, and means to create suction for drawing said gas stream upwardly through the duct via said first inlet and first outlet and to separate the lighter particles from the suction gas stream, said suction being applied to said second inlet from the duct interior, said duct structure having a second outlet below the level of the first outlet and laterally offset from the main path of suction gas flowing upwardly in the duct structure, the duct structure having gas venting for effecting a reduction in the upward velocity of suction gas in the ducting above the level of the second outlet so that a fraction of said lighter particles of relatively heavier weight may drop downwardly for ultimate escape through said second outlet.

13. In separator apparatus of the character described, generally vertical duct structure having a first inlet and a first outlet to pass a stream of suction gas upwardly in the duct interior, the duct having a second inlet above the level of the first inlet to pass particles of material into the duct, the duct structure containing surfaces facing upwardly and sloping downwardly and laterally in cascade relation within the duct interior and defining a tortuous path for the suction gas and said particles to travel in such relation that heavier particles tend to drop downwardly in the duct cascading off said surfaces and lighter particles tend to rise in the duct, and means to create suction for drawing said gas stream upwardly through the duct via said first inlet and first outlet and to separate the lighter particles from the suction gas stream, said suction being applied to said second inlet from the duct interior, certain of said surfaces being defined by baffling arranged in vertical sequential relation within the duct interior to effect repeated division and recombination of the upwardly flowing suction gas stream, others of said surfaces being angled for directing the heavier particles to cascade downwardly and laterally onto said certain surfaces and to receive impingement of said heavier particles cascading off said certain surfaces.

14. The combination of claim 13 in which said certain surfaces taper upwardly and said other surfaces taper downwardly.

15. In separator apparatus of the character described, generally vertical duct structure having a first inlet and a first outlet to pass a stream of suction gas upwardly in the duct interior, the duct having a second inlet above the level of the first inlet to pass particles of material into the duct, the duct structure containing surfaces facing upwardly in cascade relation within the duct interior and defining a tortuous path for the suction gas and said particles to travel in such relation that heavier particles tend to drop downwardly in the duct cascading off said surfaces and lighter particles tend to rise in the duct, means to create suction for drawing said gas stream through the duct outlet and to separate the lighter particles from the suction gas stream, certain of said surfaces being defined by baffles arranged in vertical sequential relation within the duct interior to effect repeated division and recombination of the upwardly flowing suction gas stream, others of said surfaces being angled for directing the heavier particles to cascade downwardly and laterally onto said certain surfaces and to receive impingement of said heavier particles cascading off said certain surfaces, and means to rotate said baffles about a vertical axis.

16. In separator apparatus of the character described, generally vertical duct structure having a first inlet and a first outlet to pass a stream of suction gas upwardly in the duct interior, the duct having a second inlet above the level of the first inlet to pass particles of material into the duct, the duct structure containing surfaces facing upwardly in cascade relation within the duct interior and defining a tortuous path for the suction gas and said particles to travel in such relation that heavier particles tend to drop downwardly in the duct cascading off said surfaces and lighter particles tend to rise in the duct, and means to create suction for drawing said gas stream through the duct outlet and to separate the lighter particles from the suction gas stream, certain of said surfaces being defined by baffling arranged in vertical sequential relation within the duct interior to effect repeated division and recombination of the upwardly flowing suction gas stream, others of said surfaces being angled for directing the heavier particles to cascade downwardly and laterally onto said certain surfaces and to receive impingement of said heavier particles cascading off said certain surfaces, and said baffling being defined by a vertically elongated sheet twisted about a vertical axis.

17. The method of classifying a mixture of heavier and lighter particles, that includes feeding said mixture in a side stream and introducing said side stream mixture of particles to a vertically elongated confined zone and at an elevation such that the material tends to fall therein, drawing a main stream of suction gas upwardly within said zone while applying suction to said side stream from said zone and directing said main stream to flow tortuously therein to carry lighter particles upwardly, directing the heavier particles to cascade downwardly and laterally within said zone, separating the lighter particles from the suction gas flow and thereafter subjecting said flow to a pressure increase followed by discharge thereof to a region out of pressure supplying communication with zone interior, and controlling the upward gas flow rate in an upper portion of said zone above the level of said side stream introduction to control the classification as between said lighter and heavier particles by controlling venting of gas from said upper portion of said zone.

18. The method of claim 17 in which said mixture consists of cotton seeds and gin trash.

19. The method of claim 17 in which said mixture consists of cotton seeds and hulls.

20. The method of classifying a mixture of heavier and lighter particles, that includes feeding said mixture in a side stream and introducing said side stream mixture of particles to a vertically elongated confined zone at an elevation such that the material tends to fall therein, drawing a main stream of suction gas upwardly within said zone while applying suction to said side stream from said zone and directing said main stream to flow tortuously therein to carry lighter particles upwardly, directing the heavier particles to cascade downwardly and laterally within said zone, separating the lighter particles from the suction gas flow, controlling the upward gas flow rate to control the classification as between said lighter and heavier particles, reducing the upward velocity of the suction gas flow within an upper portion of said zone by venting said upper portion, and effecting removal from said upper portion of said zone of a fraction of the lighter particles of relatively heavier weight that drop downwardly in said upper portion.

21. The method of classifying a mixture of heavier and lighter particles, that includes feeding said mixture in a side stream and introducing said side stream mixture of particles to a vertically elongated confined zone at an elevation such that the material tends to fall therein, drawing a main stream of suction gas upwardly within said zone while applying suction to said side stream from said zone and directing said main stream to flow tortuously therein to carry lighter particles upwardly, directing the heavier particles to cascade downwardly and laterally within said zone, separating the lighter particles from the suction gas flow, controlling the upward gas flow rate to control the classification as between said lighter and heavier particles, and effecting centrifugal throw-out of particles in said zone.

References Cited

UNITED STATES PATENTS

| | | | |
|---|---|---|---|
| 827,213 | 2/1906 | Comstock | 209—138 |
| 2,519,781 | 8/1950 | Morris | 209—159 X |
| 2,815,858 | 12/1957 | Rich | 209—138 |
| 2,865,416 | 12/1958 | Hetteen | 146—164 X |
| 3,308,945 | 3/1967 | Oja | 209—138 X |

FOREIGN PATENTS 738,342  10/1932  France.

OTHER REFERENCES

Eder: German application 1,135,841, printed Sept. 6, 1962.

Jager, German application 1,186,731, printed Feb. 4, 1965.

FRANK W. LUTTER, *Primary Examiner.*

U.S. Cl. X.R.

209—139, 144, 146, 154